United States Patent
Koerber et al.

(10) Patent No.: US 6,843,146 B2
(45) Date of Patent: Jan. 18, 2005

(54) MANUAL TRANSMISSION HAVING A LOCKING DEVICE FOR LOCKING INDIVIDUAL GEARS

(75) Inventors: Martin Koerber, Neufahrn (DE); Norbert Wagner, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 10 days.

(21) Appl. No.: 10/273,363

(22) Filed: Oct. 18, 2002

(65) Prior Publication Data

US 2003/0084739 A1 May 8, 2003

(30) Foreign Application Priority Data

Oct. 18, 2001 (DE) .......................... 101 51 467

(51) Int. Cl.[7] .............................. F16H 59/00; B60K 6/00
(52) U.S. Cl. ..................................... 74/335; 74/473.21
(58) Field of Search .............................. 74/335, 337.5, 74/473.21, 273.24, 273.25; 70/245, 247, 248

(56) References Cited

U.S. PATENT DOCUMENTS

| | | | | |
|---|---|---|---|---|
| 5,285,694 A | * | 2/1994 | Chene | 74/335 |
| 5,394,765 A | * | 3/1995 | Ono et al. | 74/473.24 |
| 5,492,209 A | * | 2/1996 | Certeza | 74/339 |
| 5,996,436 A | * | 12/1999 | Dreier et al. | 74/473.21 |
| 6,234,038 B1 | * | 5/2001 | Loeffler | 74/473.37 |

FOREIGN PATENT DOCUMENTS

| | | |
|---|---|---|
| DE | 39 29 270 A1 | 3/1990 |
| DE | 196 15 267 C1 | 6/1997 |
| DE | 198 43 584 A1 | 3/2000 |
| DE | 199 51 683 A1 | 5/2001 |
| EP | 1 236 936 A2 | 1/2002 |
| JP | 56-85124 | 7/1981 |

OTHER PUBLICATIONS

European Search Report.

* cited by examiner

*Primary Examiner*—Roger Pang
(74) *Attorney, Agent, or Firm*—Crowell & Moring LLP

(57) ABSTRACT

For locking individual gears, a "rod-type" locking element is provided which extends in the axial direction over several operating elements and which, in the individual possible transmission shifting positions, in each case, engages with some of the existing operating elements. When one of the operating elements is shifted out of its neutral position into a shifting position, the locking rod is brought into a locking engagement with at least some of the existing operating elements.

17 Claims, 6 Drawing Sheets

MANUAL TRANSMISSION HAVING A LOCKING DEVICE FOR LOCKING INDIVIDUAL GEARS

This application claims the priority of German Patent Document No. DE 101 51 467.0-14, filed Oct. 18, 2001, the disclosure of which is expressly incorporated by reference herein.

BACKGROUND AND SUMMARY OF THE INVENTION

The present invention relates to a manual transmission having a locking device for locking individual gears.

The locking device of a manual transmission primarily has the following functions:

a) Preventing two gears from being operated simultaneously. Specifically the shifting channel of gears 3/4 is not selected cleanly during a fast shifting from the second to the third gear, that is, when a shift takes place "between the shifting channels" 1/2 and 3/4, the shift forks or shift rockers of both shifting channels may be operated simultaneously.

b) Preventing that an additional gear from coming into a shifting engagement when one gear is engaged. This could occur by a "self-acting" displacement of sliding sleeves as a result of vehicle vibrations or when locking elements, which exercise forces on shift forks or shift rockers, are defective.

DE 39 29 270 A1 discloses a manual transmission in which the sliding sleeves assigned to the individual shifting channels are in each case axially displaceable by way of a shift rod and a shift fork fastened thereto. In this transmission, the "locking device" is formed by a locking plate. The locking plate is arranged orthogonally to the shift rods and is slidably disposed in the transmission case in the plate direction. The individual shift rods extend through a recess provided in the locking plate and each have locking notches in which the locking edges of the locking plate engage. By means of the locking plate, it is ensured that only one of the shift rods is axially displaceable and the other shift rods are locked.

In the case of locking devices, a differentiation is made between "active" and "passive" locking systems. An active locking system is disclosed in DE 196 15 267 C1, wherein when a shifting channel is selected, only this shifting channel is opened up and the other shifting channels are locked. In contrast, in the case of a passive locking system, the locking will be "activated" only when the shift fork or shift rocker is shifted.

Bayerische Motoren Werke AG has a five-speed manual transmission with shift rockers in which for locking individual shift rockers three locking levers disposed in the transmission case are provided which are connected with one another in an articulated manner. An expansion of this "locking lever system" to a six-speed transmission is problematic. The reason is that, in the case of a six-speed transmission, an additional locking lever is required. This would lead to an addition of component tolerances and would be difficult to control constructively.

It is an object of the invention to provide a locking device for a manual transmission which has a simple construction.

An aspect of the invention relates to a "rod-type" locking element which extends in the axial direction along several operating elements and which, in the individual possible transmission shifting positions, engages in each case with some of the existing operating elements. When one of the operating elements is shifted from its neutral position into a shifting position, the "locking" rod is brought into a locking engagement at least with some of the existing operating elements; that is, these operating elements will then be locked. Since the locking takes place during the engaging of a gear; that is, when an operating element is operated, a "passive" locking device is present according to the above-mentioned terminology.

The "operating elements" may be shift rockers or shift forks. They have a "locking finger". For locking the operating element, notch-type or groove-type recesses are provided on the locking rod, which recesses can be caused to engage with the respectively assigned locking finger.

The notch-type recesses may be provided on opposite longitudinal sides of the rod-type locking element. However, the recesses do not have to be provided on the exterior sides or longitudinal sides of the locking element.

In a variant of the invention, the locking element has several closed, for example, rectangular or oblong "shifting recesses" into which the locking fingers project and in which the locking fingers are longitudinally displaceable, that is, shiftable in certain positions. In this case, the notch-type recesses are provided on the lateral "edges" of the rectangular or oblong "shifting recesses". In the top view, the notch-type recesses are not situated on the outer contour of the locking element but within its outer contour. The notch-type recesses therefore form a portion of the contour of the shifting recesses. If the locking element is a locking plate, the shifting recesses or the notch-type recesses may, for example, be punched.

The locking fingers of the operating elements assigned to the individual shifting channels are arranged in an "offset" manner. This means that some of the existing locking fingers are arranged on a first longitudinal side of the locking rod and the other locking fingers are arranged on the opposite longitudinal side of the locking rod. Preferably, the locking fingers of shifting channels situated side-by-side in the shifting diagram are alternately arranged on one or on the other longitudinal side of the locking rod.

In the case of the above-mentioned variant of the invention, in which the notch-type recesses form a portion of the interior contour of the oblong shifting recesses, the term "offset" is to be understood such that some of the notch-type recesses are provided on the left longitudinal sides of individual "oblong holes", and the other notch-type recesses are provided on the right longitudinal sides of the other "oblong holes".

The locking rod is fixedly arranged in the axial direction and is displaceably arranged in a transverse direction. It may be disposed to be transversely displaceable in the transmission case, for example, by way of a simple slide bearing. However, a "case-side" bearing is not necessarily required. Specifically, the locking rod may also be disposed exclusively by way of its "locking recesses" at the locking fingers of the shift rockers engaged at that time.

The recesses of the locking rod preferably each have two "function bevels" which converge in a V-shape. When all operating elements are in the neutral position and an operating element is shifted whose locking finger in the neutral position engages with a recess of the locking rod, when the operating element is shifted, this locking finger can slide on one of the function bevels out of the recess. The locking finger of the currently operated operating element in this case applies a "transverse force" upon the locking rod. The locking rod is laterally displaced by this transverse force. As a result of the shifting of the operating element from its neutral position into its shifting position and the thus caused lateral displacement of the locking rod, a portion of the locking fingers is lockingly engaged with the locking rod. The locking rod is therefore displaced exclusively by the moving of the operating elements. A separate operating device for the locking rod is therefore not required.

In comparison to "multi-member" locking devices, a "locking rod" according to the invention has the important advantage that very low component tolerances are achieved. Furthermore, no or only a few housing-side bearings are required.

The locking device according to the invention is also distinguished in that no connection exists between the shifting shaft, which is connected with the shift lever to be operated by the driver, and the locking rail. The "linear displacement" of the locking rail is therefore not induced directly by way of the shift lever or the shifting shaft connected therewith but exclusively by way of the locking fingers of the operating elements, that is, the shift forks or the shift rockers.

The operating elements and the assigned recesses in the locking rod are preferably arranged such that adjacent shifting channels in the "shifting diagram", that is R and 1/2, 1/2 and 3/4 or 3/4 and 5/6, cannot be shifted simultaneously.

In a variant of the invention, a swivellably disposed "additional lever" is provided on each side of the locking rod. The additional levers are arranged such that the locking fingers of the shift rockers are situated between the locking rod and the respective additional lever. With such additional levers, it can be ensured that, with the exception of the currently operated shift fork or shift rocker, all other shift forks or shift rockers are locked.

Other objects, advantages and novel features of the present invention will become apparent from the following detailed description of the invention when considered in conjunction with the accompanying drawings.

DETAILED DESCRIPTION OF THE DRAWINGS

Figure 1:
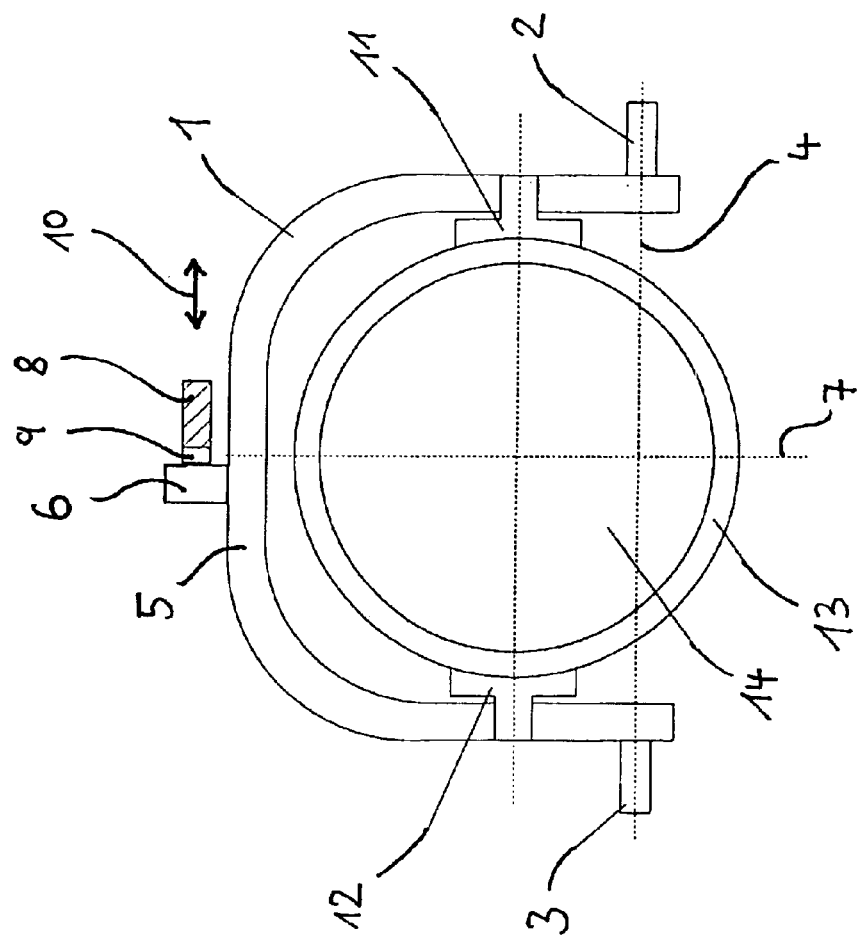
FIG. 1 is a cross-sectional view of a partial area of a transmission in the area of a shift rocker.

FIG. 1 is a cross-sectional view of a section of a manual transmission in the area of a U-shaped shift rocker 1. Pivot bearing journals 2, 3 are provided at the two legs of the shift rocker 1. With the pivot bearing journals 2, 3, the shift rocker 1 is swivellably disposed about an axis 4 in the transmission case. A locking finger 6 is provided at a transverse web 5 of the shift rocker 1. Here, the locking finger 6 is arranged laterally offset with respect to a central vertical axis 7 of the shift rocker 1.

Furthermore, a locking rod 8 is provided which extends in the axial direction and has a locking recess 9. The locking rod 8 can be displaced in a transverse direction 10, whereby the locking finger 6 can be caused to engage in the locking recess 9 and the shift rocker 1 can be locked.

Driving devices or sliding blocks 11, 12 are disposed in the two side legs of the shift rocker 1, which sliding blocks 11, 12 engage in a surrounding ring groove (not shown) of a sliding sleeve 13. The sliding sleeve 13 is non-rotatably but axially displaceably arranged on a fixed sleeve 14. By swivelling the sliding sleeve 1 about the swivelling axis 4, the sliding sleeve 13 can be displaced in the axial direction and a gear can be shifted.

By displacing the locking rod 8 into the transverse direction 10, the "degree of swivelling freedom" of the shift rocker 1 can be locked.

Figure 6:
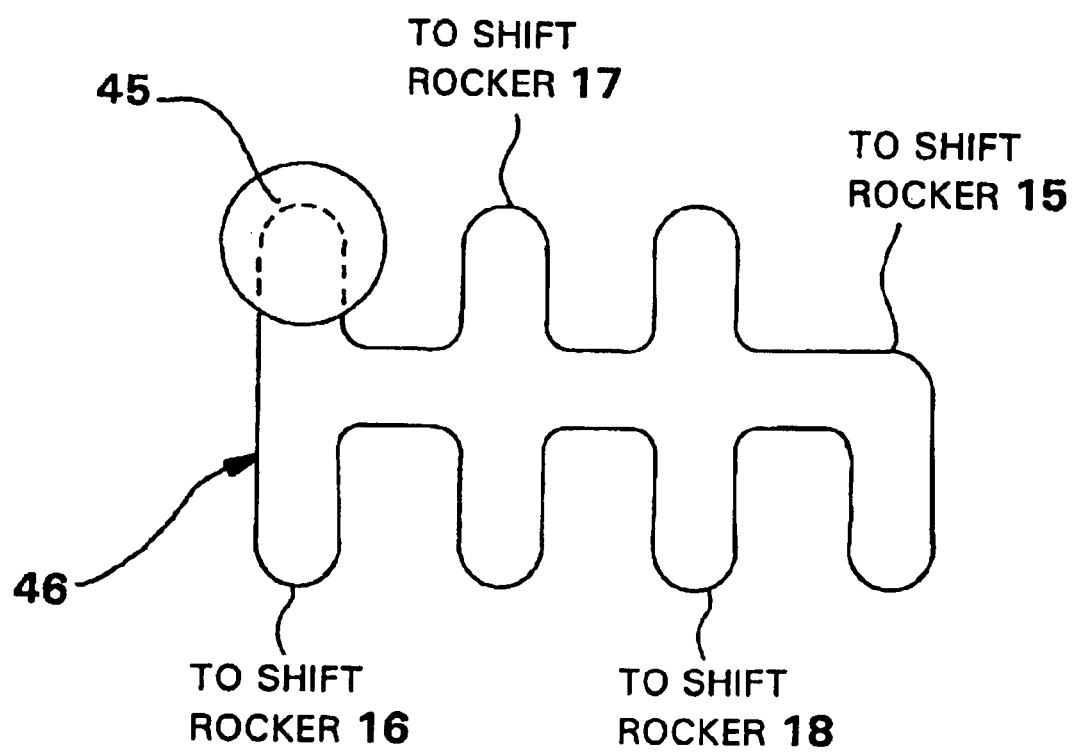
FIG. 6 is a schematic diagram showing a shift lever and how the shift channels of the shift lever are associated with the shift rockers.

For reasons of completeness, it is pointed out that FIG. 1 does not show the "point" at which the shifting force applied by the driver by way of the shift lever is introduced into the shift rocker 1. FIG. 6 is a schematic diagram showing a shift lever 45 and how the shift channels 46 of the shift lever 45 are associated with the shift rockers 15–18.

Figure 2:
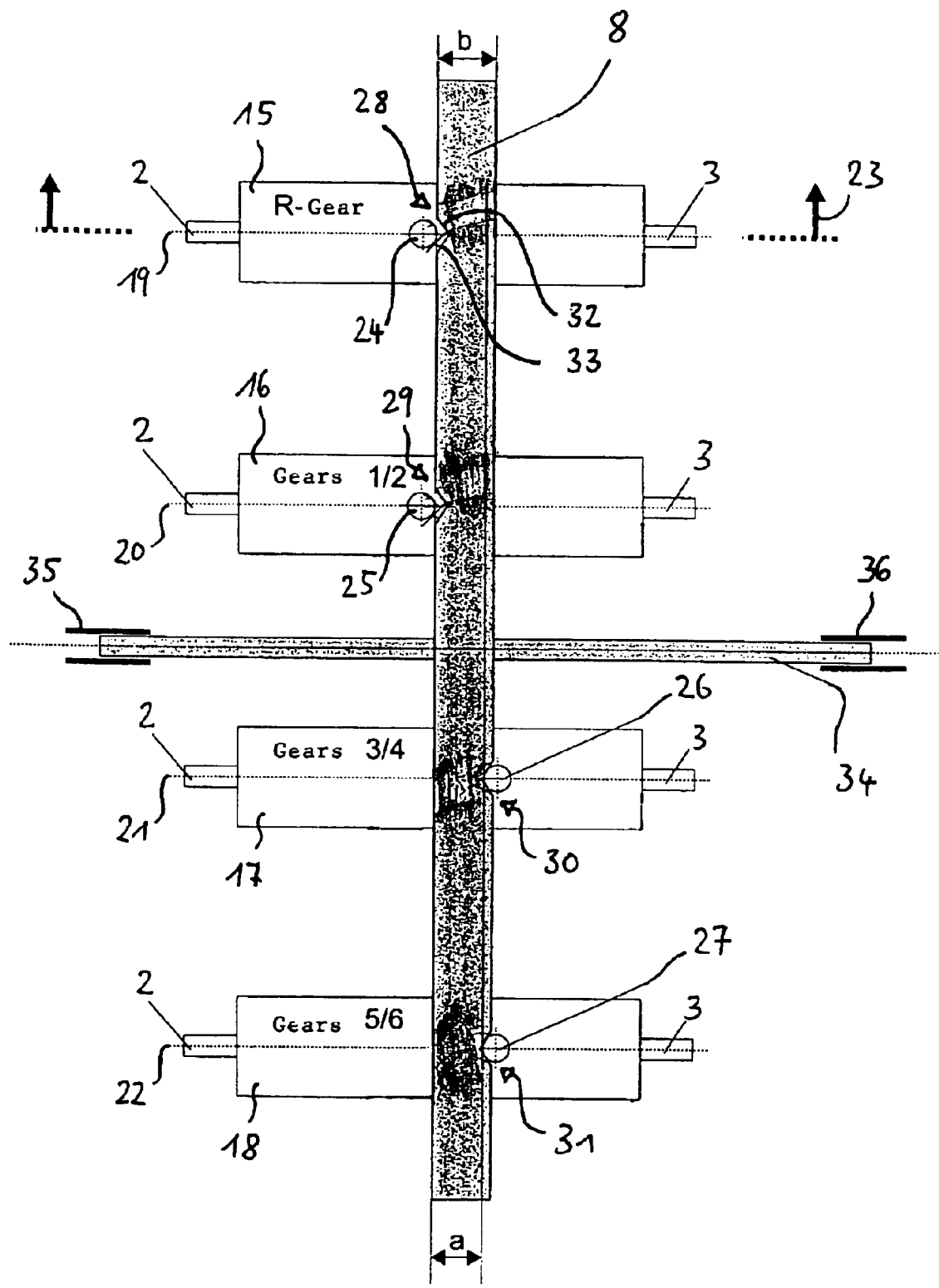
FIG. 2 is a view of a 6-speed transmission with shift rockers, in which all shift rockers are in a neutral position.

FIG. 2 shows a cut-out from a 6-speed transmission with four shift rockers 15–18 which are arranged behind one another in the axial direction and which can each be swivelled by way of assigned pivot bearing journals 2, 3 about transverse axes 19–22. The shift rocker 15 only shifts the reverse gear and can therefore be swivelled here only in a direction indicated by the arrows 23. The shift rockers 16–18 assigned to the other shifting channels each shift two gears. Specifically, the shift rocker 16 shifts the first and second gear, the shift rocker 17 shifts the third and fourth gear, and the shift rocker 18 shifts the fifth and sixth gear. The shift rockers 16–18 can correspondingly be swivelled in two directions.

On the transverse webs of the shift rockers 15 to 18 visible in FIG. 2, locking fingers 24 to 27 are provided which project upward. The locking fingers 24–27 are arranged offset with respect to the locking rod 8, in which case, in the embody shown here, the locking fingers 24 and 25 are arranged on the "left" and the locking fibers 26, 27 are arranged on the "right" of the locking rod 8. In the area of the locking fingers 24–27, the locking rod 8 has recesses 28–31. Here, the recesses 28 to 31 are in each case formed by two function bevels 32, 33 converging in a V-shape.

As illustrated in FIG. 2, the locking fingers 24, 25 are arranged at a distance a from the locking fingers 26, 27. The locking rod 8 here has a width b which is greater than the spacing a of the locking fingers. By way of a bearing rod 34, it is displaceably in the transverse direction disposed in transmission-case-fixed slide bearing bushes 35, 36.

In the position illustrated here, the shift rockers 15–18 are in their center or neutral position. This is indicated by the fact that all locking fingers 24–27 are aligned according to the assigned recesses 28 to 31. In this neutral position, each of the shift rockers 15–18 can be operated. Here, a swivelling of the shift rockers 15, 16 has no effect on the position of the locking rod 8 because the assigned locking fingers 24, 25 are disengaged. In contrast, a swivelling of the shift rocker 17 and 18 respectively has the effect that the assigned shift finger 26 and 27 respectively displaces the locking rod 8 along one of the assigned function surfaces to the "left" and locks the shift rockers 15, 16.

Figure 3:
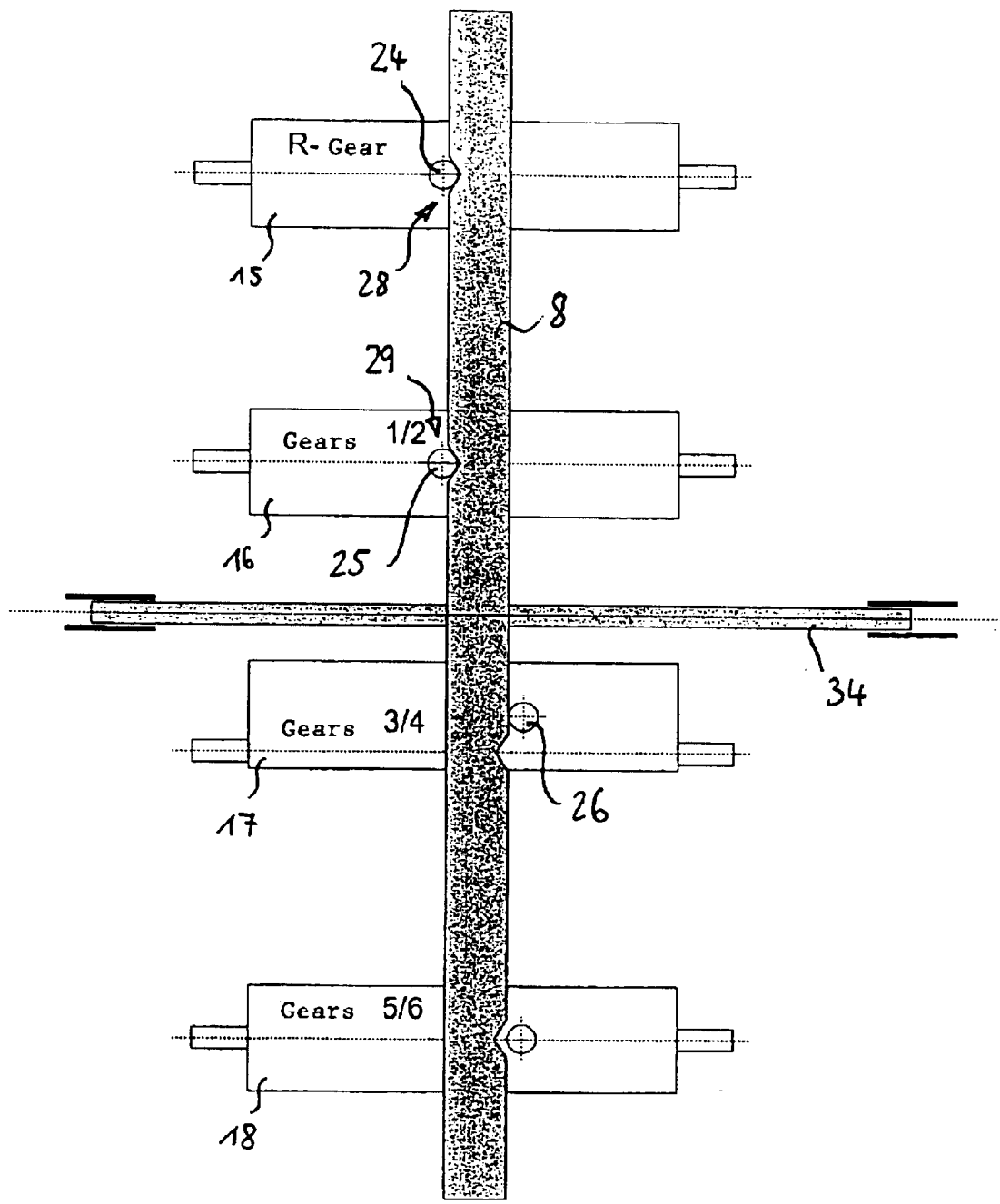
FIG. 3 is a view of a shifting position in which individual shift rockers are locked.

This locking condition is illustrated in FIG. 3. Here, the shift rocker 17 is shifted; that is, it is swivelled from its center or neutral position in the direction of the bearing rod 34. In comparison to the neutral position of FIG. 2, the locking finger 26 of the shift rocker 17 has pressed the locking rod 8 to the "left". In this position, the locking fingers 24, 25 engage in the assigned recesses 28, 29. Because the locking finger 26 prevents a "sliding-back" of the locking rod, the shift rockers 15, 16 are locked. An unintentional engaging of the reverse gear or of the first or second gear is therefore impossible. In contrast, the shift rocker 18 is unlocked here.

Figure 4:
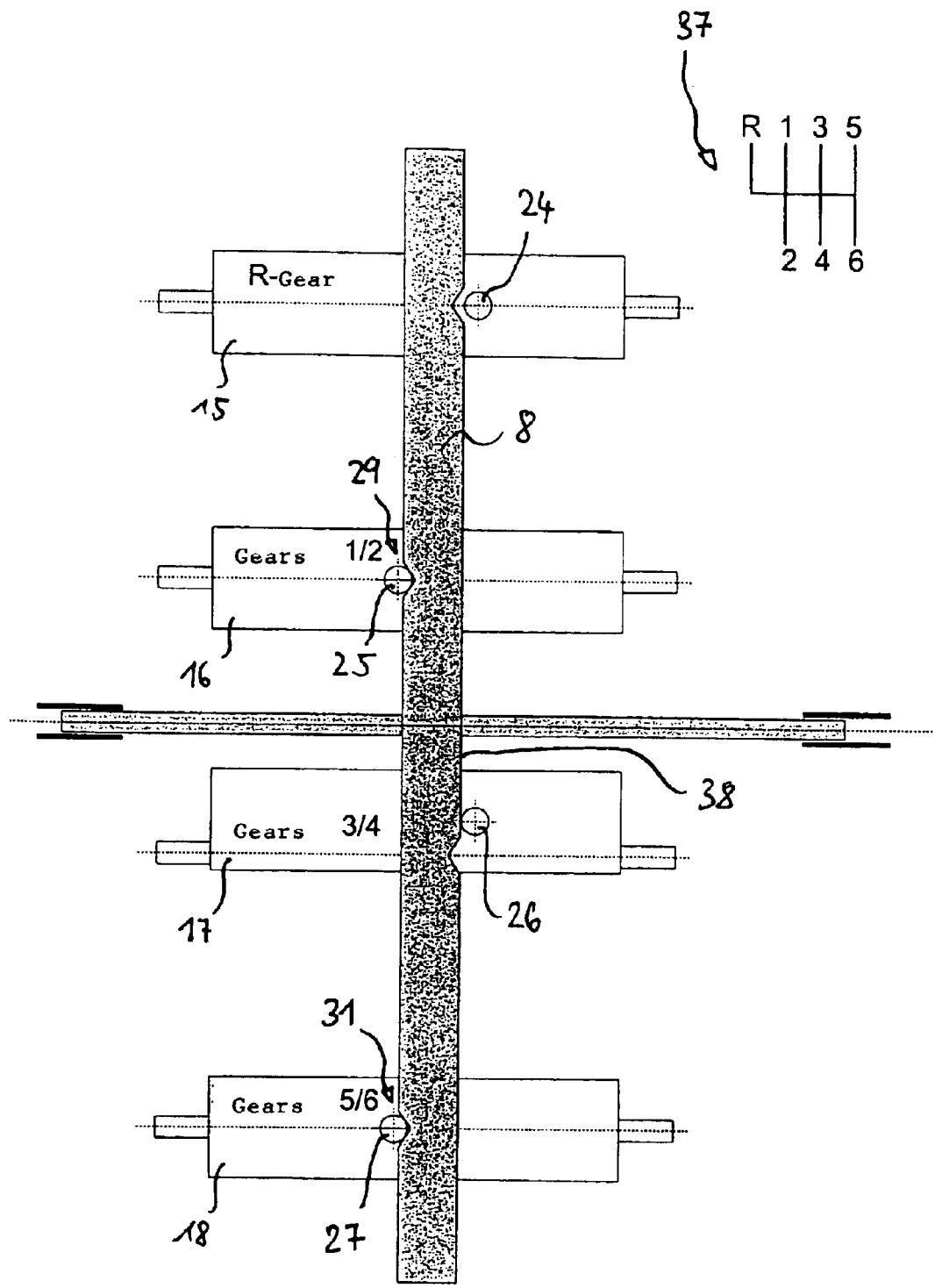
FIG. 4 is a view of a shifting position of another embodiment in which individual shift rockers are locked.

FIG. 4 shows an embodiment in which the shift rocker 17 is also shifted. The shift rocker 17 is assigned to the shifting channel of the third and fourth gear. The shifting channels 1/2 and 5/6 respectively are situated adjacent to the shifting channel 3/4, which is best illustrated in shifting diagram 37. In the shifting position illustrated in FIG. 4, the locking finger 26 rests against an exterior side 38 of the locking rod 8. In contrast to FIG. 3, in this case, the locking fingers 25 and 27 engage with the assigned recesses 29, 31. This means that here the shifting channels 1/2 and 5/6 respectively adjacent to the shifted shifting channel 3/4 are locked.

For this purpose, the locking fingers 24–27, which are successive in the axial direction, of the shifting channels which are successive in the shifting diagram are alternately arranged on the "left" and "right" side respectively of the locking rod 8. As a result, it is ensured that those shifting channels are locked which are situated adjacent to the currently engaged gear.

When the reverse gear is shifted, the adjacent shifting channel 1/2 and additionally 5/6 is locked, but 3/4 is unlocked. When the first or second gear is shifted, the adjacent shifting channels R and 3/4 are locked, while 5/6 is unlocked. When the third or fourth gear is shifted, 1/2 and 5/6 are locked, whereas R is unlocked. Finally, when the fifth or sixth gear are shifted, the shifting channel 3/4 is locked and additionally R is locked, whereas 1/2 remains unlocked.

Figure 5:
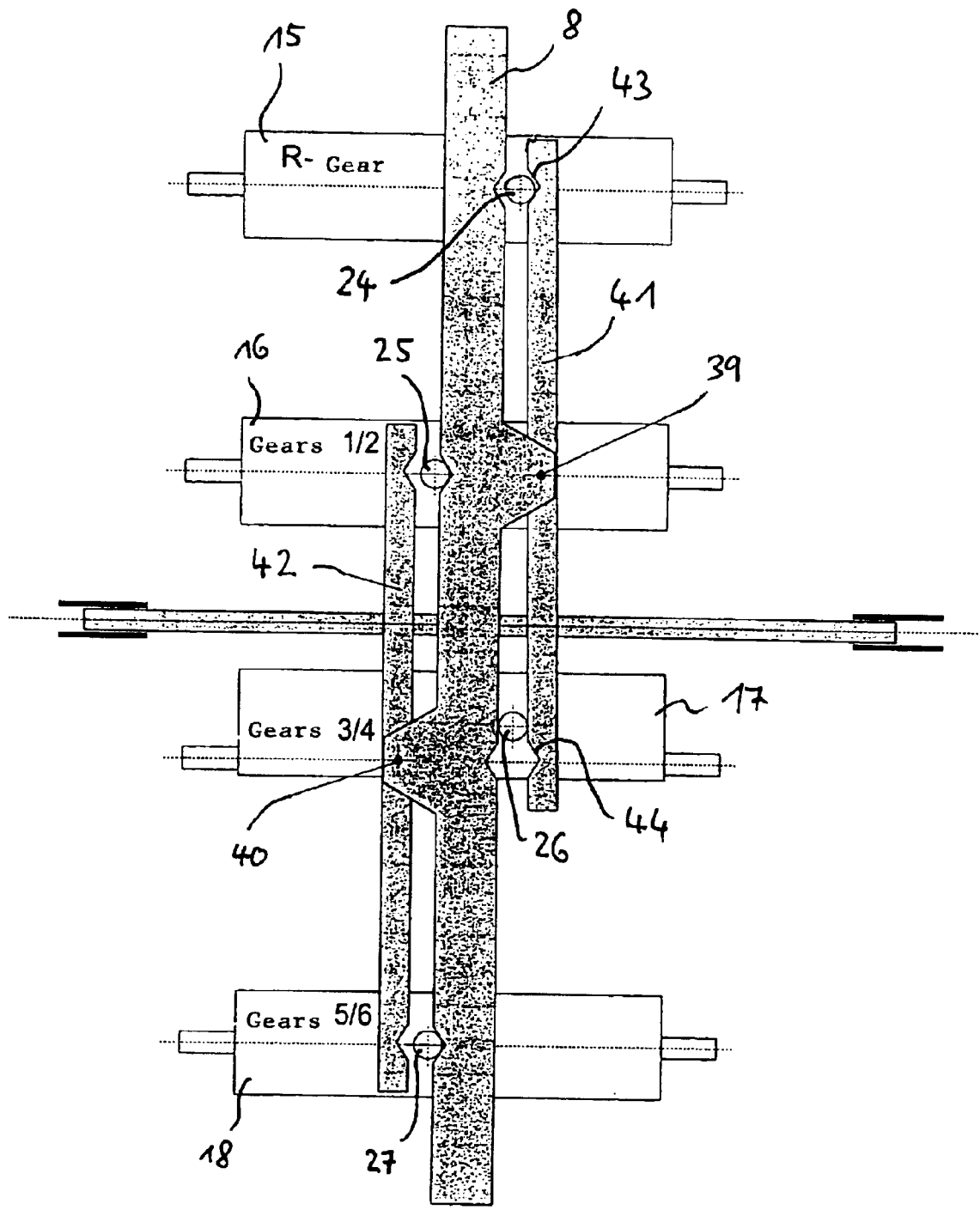
FIG. 5 is a view of an embodiment having a locking rod with additional levers.

FIG. 5 shows an embodiment with a locking rod 8 on which an additional locking lever 41, 42 is arranged on both sides by way of pivot bearings 39, 40. In cooperation with the locking rod 8, the additional locking levers 41, 42 ensure that, when one gear is engaged, all other shift forks or shift rockers are locked.

Analogous to the shifting positions of FIGS. 3, 4, also in FIG. 5, the shifting rocker 17 is shifted, whereas the shifting rockers 15, 16 and 18 are in their center or neutral position. In contrast to FIGS. 3 and 4, here, with the exception of the currently shifted shift rocker 17, all other shift rockers are locked. The reason is that the locking finger 26, which is assigned to the shift rocker 17, on the one hand, presses the locking rod 8 to the "left", so that the locking fingers 25, 27 come into a locking engagement and lock the shifting channels 1/2 and 5/6 respectively. Additionally, the locking finger 26 presses against the additional lever 41, so that the latter, by means of one of its two recesses 43, 44, specifically recess 43, comes into a locking engagement with the locking finger 24 of the shift rocker 15.

The pivot bearings 39, 40 may be constructed such that the additional locking lever 41, 42, as illustrated in FIG. 5, can be swivelled about a "vertical axis". In this case, the swivel levers are arranged "laterally", that is, on both longitudinal sides of the locking rod 8.

As an alternative, it may also be provided that an additional lever can be swivelled about a "transverse axis" of the locking rod 8. In this case (not shown), the additional lever, similar to a rocking bar, would be arranged on the top side of the locking rod 8 illustrated in FIG. 5. It would then be swivellable in the manner of a rocking bar in a plane perpendicular to the plane of the drawing of FIG. 5. The additional lever would therefore by means of its two free ends rest from "above" on the locking fingers or lock one of the two assigned locking fingers. The notch-type recesses would then be provided on the underside of the additional lever facing the top side of the locking fingers.

As an alternative to FIG. 5, the additional locking levers 41, 42 may be disposed on the transmission case (not shown).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Manual transmission comprising sliding sleeves displaceable in an axial direction, an operating element associated with each sliding sleeve, a locking element for locking the operating elements, wherein the locking element can selectively lock the operating elements, wherein the locking element extends in the axial direction over the operating elements, wherein the operating elements each have a projecting locking finger for locking the degrees of operating freedom of the operating elements, and wherein the locking fingers are arranged to be offset with respect to the locking element, such that some of the locking fingers are arranged on a first longitudinal side of the locking element and the other locking fingers are arranged on the opposite longitudinal side of the locking element.

2. Manual transmission according to claim 1, wherein the operating elements are shift rockers that each have a swiveling axis which extends transversely with respect to the axial direction.

3. Manual transmission according to claim 1, wherein the locking fingers which are successive in the axial direction are alternately arranged on one or the other longitudinal side of the locking element.

4. Manual transmission according to claim 1, wherein the operating elements are shift forks.

5. Manual transmission according to claim 1, wherein the locking element is fixedly arranged in the axial direction and is displaceably arranged in a transverse direction perpendicular to the axial direction.

6. Manual transmission according to claim 2, wherein the locking element is displaceable in a transverse direction which is parallel to the swiveling axes of the operating elements.

7. Manual transmission according to claim 1, wherein the locking element is displaceably in a direction transverse to the longitudinal direction.

8. Manual transmission according to claim 1, wherein the locking element is displaceable exclusively by operation of the operating elements.

9. Manual transmission according to claim 1, wherein the width of the locking element is greater than the spacing of locking fingers in a direction that is transverse to the longitudinal direction.

10. Manual transmission according to claim 1, further comprising a shift lever which has several shifting channels situated side-by-side, a sliding sleeve being assigned to each shifting channel, and wherein a shifting channel situated adjacent to a currently shifted shifting channel is locked by the locking element.

11. Manual transmission according to claim 10, wherein, with the exception of the currently shifted shifting channel, all other shifting channels are locked.

12. Manual transmission according to claim 1, wherein the locking element is a rod.

13. Manual transmission comprising sliding sleeves displaceable in an axial direction, an operating element associated with each sliding sleeve, a locking element for locking the operating elements, wherein the locking element can selectively lock the operating elements, wherein the locking element extends in the axial direction over the operating elements, wherein the operating elements have a projecting locking finger for locking the degrees of operating freedom of the operating elements, wherein the locking element has recesses which can be engaged with the respective locking fingers, and wherein the recesses each have two function bevels which converge in a V-shape, during the operation of an operating element, its locking fingers being in an engagement with a recess of the locking element, this locking finger sliding out of the recess along one of the function bevels and, in the process, displacing the locking element in the transverse direction and engaging it with others of the existing operating elements.

14. Manual transmission according to claim 13, wherein the locking element is disposed exclusively by way of an engagement of the locking fingers in the respective recesses.

15. Manual transmission according to claim 13, wherein the locking element has several oblong recesses in its longitudinal direction, into which recesses the operating elements are designed respectively to project, at least one of the operating elements being shiftable, and the recesses which can be engaged with the respective locking fingers each being provided on one or on the other interior longitudinal side of the oblong recesses.

16. Manual transmission comprising sliding sleeves displaceable in an axial direction, an operating element associated with each sliding sleeve, a locking element for locking the operating elements, wherein the locking element can selectively lock the operating elements, wherein the locking element extends in the axial direction over the operating elements, wherein the operating elements have a projecting locking finger for locking the degrees of operating freedom of the operating elements, and wherein, on at least one side of the locking element, at a lateral distance, an additional lever is swivellably disposed, two of the locking fingers being arranged between the locking element and the additional lever.

17. Manual transmission according to claim 16, wherein the additional lever has recesses which can be engaged with assigned some of the locking fingers.

* * * * *